(12) United States Patent
Ilyasov et al.

(10) Patent No.: US 7,426,582 B1
(45) Date of Patent: Sep. 16, 2008

(54) METHOD, SYSTEM, AND APPARATUS FOR SERVICING PS/2 DEVICES WITHIN AN EXTENSIBLE FIRMWARE INTERFACE ENVIRONMENT

(75) Inventors: Oleg Ilyasov, Lilburn, GA (US); Andriy Naborskyy, Lilburn, GA (US)

(73) Assignee: American Megatrends, Inc., Norcross, GA (US)

( * ) Notice: Subject to any disclaimer, the term of this patent is extended or adjusted under 35 U.S.C. 154(b) by 340 days.

(21) Appl. No.: 11/119,318

(22) Filed: Apr. 29, 2005

(51) Int. Cl.
*G06F 3/00* (2006.01)

(52) U.S. Cl. ............................. 710/2; 710/17; 710/33; 710/52

(58) Field of Classification Search ................. 710/2, 710/17, 33, 52
See application file for complete search history.

(56) References Cited

U.S. PATENT DOCUMENTS

| | | | |
|---|---|---|---|
| 4,527,250 A | 7/1985 | Galdun et al. | |
| 5,964,853 A | 10/1999 | Falik et al. | |
| 6,106,564 A * | 8/2000 | Chen | 703/21 |
| 6,229,538 B1 * | 5/2001 | McIntyre et al. | 715/734 |
| 6,532,499 B1 * | 3/2003 | Nakamura | 710/1 |
| 6,678,766 B1 * | 1/2004 | Feustel | 710/100 |
| 6,802,015 B2 * | 10/2004 | Atkinson | 713/322 |
| 6,826,699 B1 | 11/2004 | Sun | |
| 6,988,139 B1 | 1/2006 | Jervis et al. | |
| 7,028,299 B1 | 4/2006 | Chang | |
| 7,047,331 B2 * | 5/2006 | Dickens | 710/63 |
| 7,191,263 B2 | 3/2007 | Sankaravadivelu et al. | |
| 7,206,974 B2 * | 4/2007 | Kozlov et al. | 714/44 |
| 2002/0162038 A1 * | 10/2002 | Bullman et al. | 713/323 |
| 2005/0229000 A1 * | 10/2005 | Shoji et al. | 713/182 |
| 2005/0246719 A1 | 11/2005 | Oshins et al. | |
| 2006/0168376 A1 | 7/2006 | Ilyasov | |

OTHER PUBLICATIONS

U.S. Official Action dated Jul. 2007 in U.S. Appl. No. 11/118,257.
Thomas, Dave and Hunt, Andy. "State Machines". IEEE Software. vol. 19, Issue 6. Nov./Dec. 2002. pp. 10-12.
Extensible Firmware Interface Specification, Intel Corp., Dec. 1, 2002 Ver. 1.10.
Coraor, Lee, et al., "A General Model for Memory-Based Finite-State Machines," Feb. 1987, IEEE Transactions on Computers, vol. C-36, No. 2, pp. 175-184.
U.S. Official Action dated Dec. 3, 2007, in U.S. Appl. No. 11/118,257.
U.S. Notice of Allowance / Allowability dated Mar. 28, 2008 in U.S. Appl. No. 11/118,257.

* cited by examiner

*Primary Examiner*—Niketa I. Patel
*Assistant Examiner*—Zachary K Huson
(74) *Attorney, Agent, or Firm*—Hope Baldauff Hartman, LLC

(57) ABSTRACT

Methods, systems, and computer-readable media service PS/2 devices within an extensible firmware interface (EFI) environment where the PS/2 devices provide data via a keyboard controller. The method involves receiving a request for data from an EFI driver, in response to receiving the request, determining whether data from any of the PS/2 devices is available for delivery to one or more EFI drivers via the keyboard controller. The method further involves in response to determining that the data is available for delivery, dispatching the data from the keyboard controller based on which PS/2 devices provided the data and forwarding the data to the EFI drivers associated with a PS/2 device providing at least some of the data.

19 Claims, 5 Drawing Sheets

ND, SYSTEM, AND APPARATUS FOR SERVICING PS/2 DEVICES WITHIN AN EXTENSIBLE FIRMWARE INTERFACE ENVIRONMENT

CROSS-REFERENCE TO RELATED APPLICATIONS

This patent application is related to and filed with U.S. patent application Ser. No. 11/118,257, entitled "Tracking States of Communication Between PS/2 Hardware and Hardware Drivers within an Extensible Firmware Interface Environment," filed on Apr. 29, 2005 which is assigned to the same assignee as this application. The aforementioned patent application is expressly incorporated herein, in its entirety, by reference.

TECHNICAL FIELD

The present invention generally relates to servicing multiple PS/2 (Personal System/2) devices. More particularly, the present invention relates to improved servicing of PS/2 devices within an extensible firmware interface environment.

BACKGROUND

In most computing systems, low level instruction code is used as an intermediary between the hardware components of the computing system and the operating software and other high-level software executing on the computing system. In some computer systems, this low level instruction code is known as the Basic Input and Output System ("BIOS"). The BIOS provides a set of software routines that allow high level software to interact with the hardware components of the computing system using standard calls.

Because of limitations of the BIOS in many PC-compatible computers, a new specification for creating the firmware that is responsible for booting the computer and for intermediating the communication between the operating system and the hardware has been proposed. The new specification is called the Extensible Firmware Interface ("EFI") specification and is available from INTEL CORPORATION.

The EFI specification describes an interface between the operating system and the system firmware. In particular, the EFI specification defines the interface that platform firmware must implement and the interface that the operating system may use in booting. How the firmware implements the interface is left up to the manufacturer of the firmware. The EFI specification provides protocols for EFI drivers to communicate with each other, and the EFI core provides functions such as allocation of memory, creating events, setting the clock, and many others. This is accomplished through a formal and complete abstract specification of the software-visible interface presented to the operating system by the platform and the firmware.

The EFI is capable of providing services to other applications. Services are implemented by modules that may be loaded by a boot loader when the EFI is started. The services may provide memory management, domain services, driver services, protocol services, and others. The EFI specification has a specific requirement for servicing hardware devices that drivers cannot use an interrupt request line ("IRQ") from hardware, such as from a PS/2 controller, and thus, EFI drivers must poll the hardware. Handling or servicing PS/2 devices in this manner by employing timer events causes inefficiency and data loss. Problems with one PS/2 device blocking another PS/2 device develop when an application does not access a device for some time.

Applications utilize specified protocols to observe input from hardware. Thus, there are multiple ways to implement an EFI driver and support the protocols. One way is to setup a timer and periodically poll the state of the PS/2 controller to ascertain whether any input data is present. Periodic polling is necessary to prevent one device from blocking another device's input. This blocking occurs when data from one source is in the PS/2 keyboard controller, but has not been taken away for a long time. In such a situation another device's data cannot pass through the controller to the corresponding driver.

PS/2 controllers have one common data out port that latches the data from the first device that produced it. Thus, periodic polling reads the data from a PS/2 device even if it is not requested by the application in order to give another source input a chance to pass data to the user. However, having two timers is an overhead that can slow down a computing system. Moreover, the basis for selecting the polling frequency is arbitrary at best and depends on user activity. Accordingly, there is a need for a method, system, and apparatus for servicing PS/2 devices within an EFI environment.

It is with respect to these considerations and others that the various embodiments of the invention have been made.

SUMMARY

In accordance with the present invention, the above and other problems are solved by methods, systems, and computer-readable mediums for servicing PS/2 devices within an EFI environment. Through the use of a novel EFI PS/2 driver in direct communication with the keyboard controller, embodiments of the invention service PS/2 devices within an EFI environment by retrieving both mouse and keyboard data and making that data available to the corresponding EFI mouse or keyboard drivers. Because a common driver distributes the mouse and keyboard data between the EFI mouse and keyboard drivers, the data distribution is more efficient, the size of the EFI mouse and the EFI keyboard drivers can be reduced, and problems with one device blocking another device's input are prevented.

According to one embodiment of the invention, a method is provided for servicing PS/2 devices within an EFI environment where the PS/2 devices provide data via a common input device controller. The method involves receiving a request for data from an EFI driver associated with the EFI environment and in response to receiving the request, determining whether data from any of the PS/2 devices is available for delivery to one or more EFI drivers via the common input device controller. The method also involves dispatching the data from the common input device controller based on which PS/2 devices provided the data in response to determining that the data is available for delivery.

Another embodiment is a computer-readable medium having control logic stored therein for causing a computer to service PS/2 devices within an EFI environment where the PS/2 devices provide data via a keyboard controller. The control logic includes computer-readable program code for causing the computer to receive a request for data from an EFI driver associated with the EFI environment, determine whether data from any of the PS/2 devices is available for delivery to one or more EFI drivers via the keyboard controller in response to receiving the request, and in response to determining that the data is available for delivery, dispatch the data from the keyboard controller based on which PS/2 devices provided the data. The control logic also includes computer-readable program code for causing the computer to forward the data to the EFI drivers associated with a PS/2 device providing at least some of the data.

Still another embodiment is a method for servicing PS/2 devices within an EFI environment where the PS/2 devices provide data via a keyboard controller. The method involves determining whether data from any of the PS/2 devices is available for delivery to one or more EFI drivers via the keyboard controller, dispatching data from the keyboard controller based on which PS/2 devices provided the data, and forwarding the data to the EFI drivers associated with a PS/2 device providing at least some of the data.

Aspects of the invention may be implemented as a computer process, a computing system, or as an article of manufacture such as a computer program product or computer-readable medium. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

DETAILED DESCRIPTION

Figure 1:
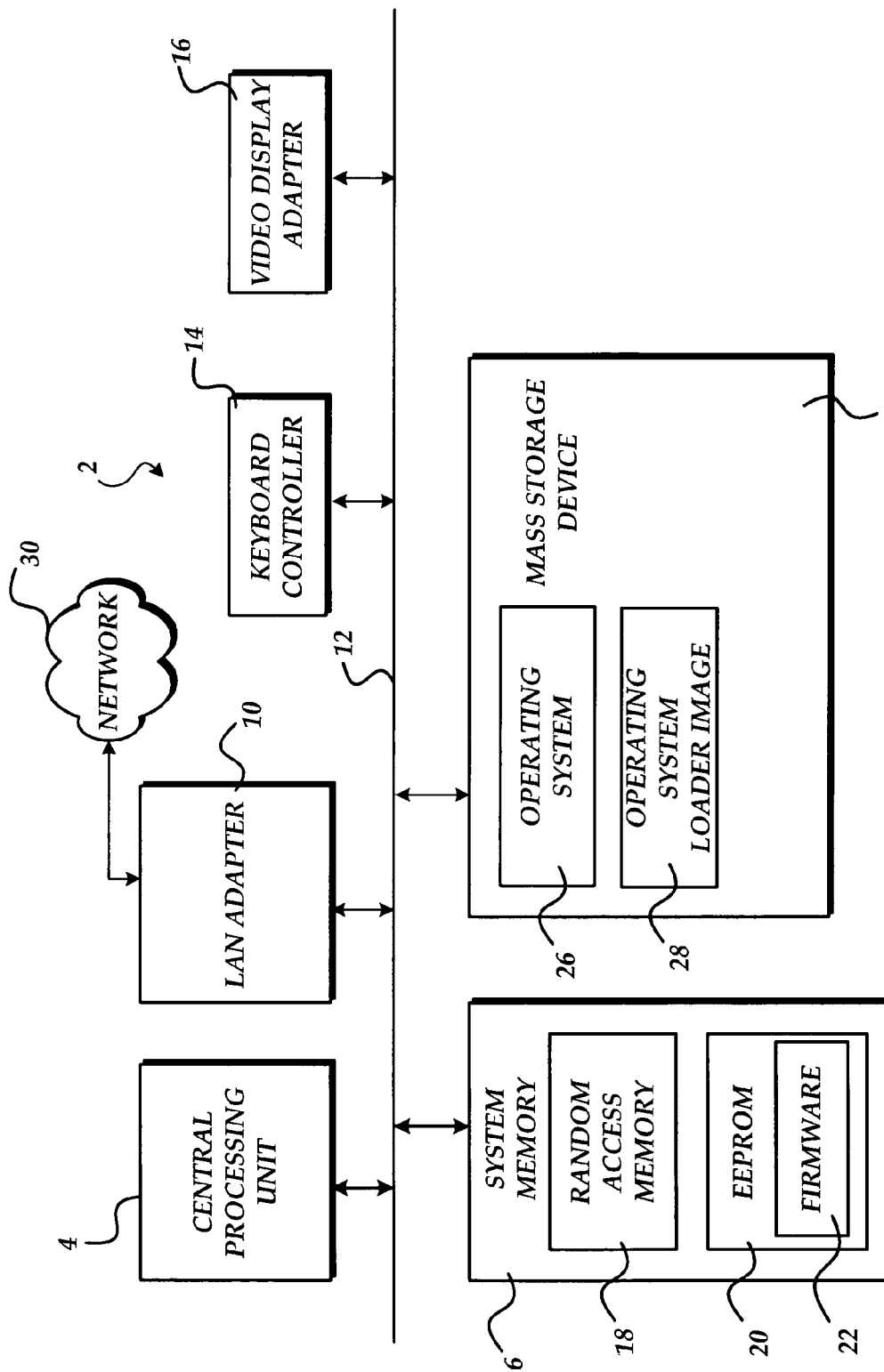
FIG. 1 is a computer architecture diagram that illustrates various components of a computer utilized in embodiments of the invention.

Embodiments of the present invention provide methods, systems, apparatuses, and computer-readable media for servicing PS/2 devices within an EFI environment. In the following detailed description, references are made to the accompanying drawings that form a part hereof, and in which are shown by way of illustration specific embodiments or examples. Referring now to the drawings, in which like numerals represent like elements throughout the several figures, aspects of the present invention and the exemplary operating environment will be described.

FIG. 1 and the following discussion are intended to provide a brief, general description of a suitable computing environment in which the invention may be implemented. While the invention will be described in the general context of program modules that execute in conjunction with the execution of a computer firmware, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Turning now to FIG. 1, an illustrative computer architecture for a computer 2 utilized in the various embodiments of the invention will be described. The computer architecture shown in FIG. 1 illustrates a conventional computer, including a CPU 4, a system memory 6, including a RAM 18, an EEPROM 20, a CMOS memory 24, and a system bus 12 that couples the memory to the CPU 4. According to an embodiment of the invention, the CPU 4 may comprise a general purpose microprocessor from INTEL CORPORATION. For instance, the CPU 4 may comprise a PENTIUM 4 or XEON microprocessor from INTEL CORPORATION. It should be appreciated that any type of CPU may be utilized including INTEL-compatible devices from AMD, MIPS processors, POWERPC devices from IBM, or other types of RISC or CISC processors.

The EEPROM 20 may store a firmware 22 for use in operating the computer 2, such as a BIOS or an extensible firmware interface ("EFI"), containing the basic routines that perform basic platform initialization and prepare the computer 2 to launch an operating system. The CMOS memory 24 is a battery-backed memory device that may be used by the firmware 22 to store setting information for the computer 2. In the case of an EFI firmware, the EEPROM 20 may be utilized to store configuration information. Additional details regarding the architecture and operation of the firmware 22 will be provided below with respect to FIGS. 2 and 3.

The computer 2 further includes a mass storage device 8 for storing an operating system 26, an operating system loader image 28, application programs, and other program modules. The mass storage device 8 is connected to the CPU 4 through a mass storage controller (not shown) connected to the bus 12. The mass storage device 8 and its associated computer-readable media, provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a network 30, such as the Internet. The computer 2 may connect to the network 30 through a local area network ("LAN") adapter 10 connected to the bus 12. It should be appreciated that the LAN adapter 10 may also be utilized to connect to other types of networks and remote computer systems. The computer 2 may also include a keyboard controller 14 for receiving input from a keyboard and a video display adapter 16 for providing output to a display screen.

Figure 2:
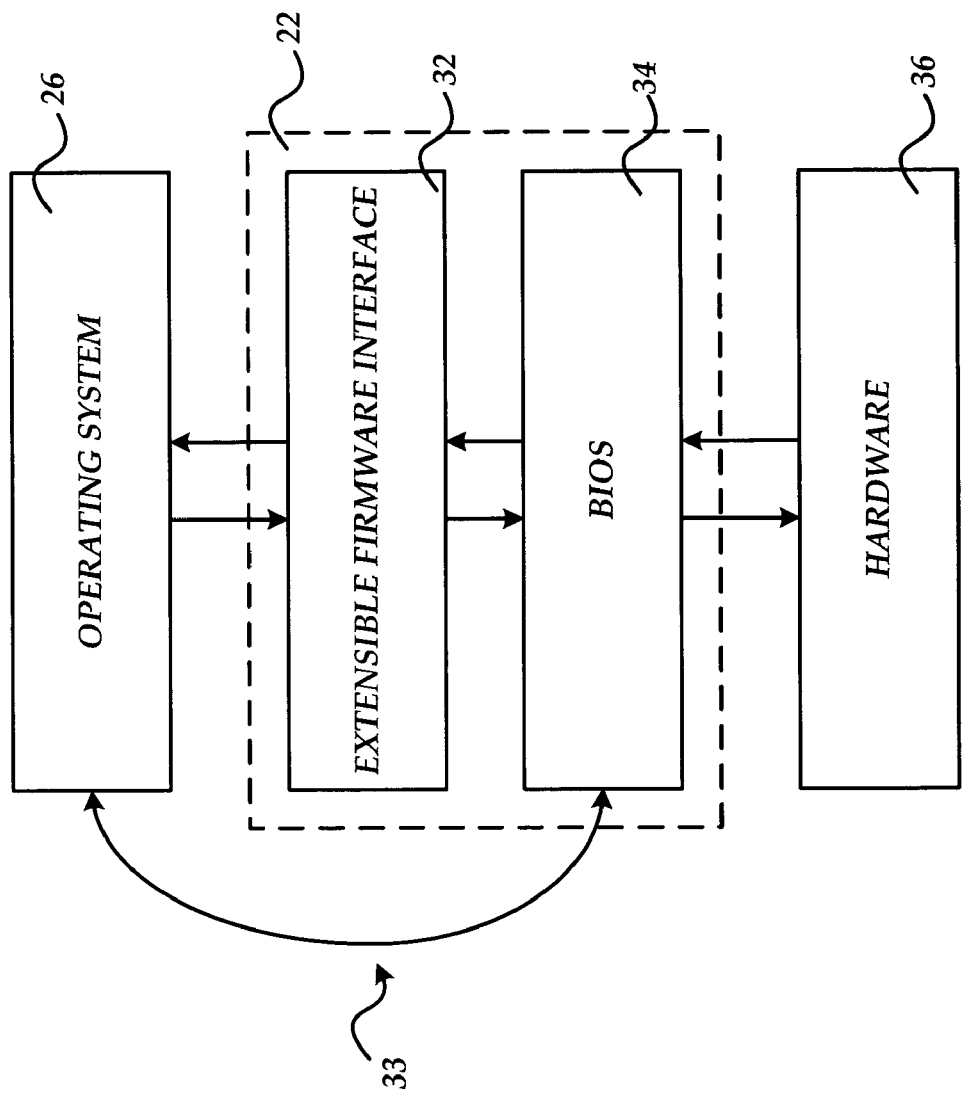
FIGS. 2 and 3 are computer architecture diagrams that illustrate aspects of an EFI environment utilized by embodiments of the invention.

Referring now to FIG. 2, additional details regarding the operation of the firmware 22 of the computer 2 will be described. According to embodiments of the invention, the firmware 22 may comprise a computer basic input output system ("BIOS"). As known to those skilled in the art, the BIOS of a PC-compatible computer provides an interface between the operating system 26 and the hardware 36 of the computer 2. Alternatively, the firmware 22 may comprise a firmware compatible with the EFI specification ver. 1.1 from INTEL CORPORATION.

The EFI specification describes an interface between the operating system 26 and the system firmware 22. The EFI specification defines the interface that platform firmware must implement, and the interface that the operating system 26 may use in booting. How the firmware 22 implements the interface is left up to the manufacturer of the firmware. The intent of the specification is to define a way for the operating system 26 and firmware 22 to communicate only information necessary to support the operating system boot process. This is accomplished through a formal and complete abstract specification of the software-visible interface presented to the operating system by the platform and the firmware.

According to one implementation of EFI on INTEL CORPORATION IA-32 platforms, both the EFI 32 and a BIOS 34 may be presented in the firmware 22. This allows users and system integrators to support both firmware interfaces. In order to provide this functionality, an interface 33 may be provided for use by legacy operating systems and applications. Additional details regarding the architecture and operation of the EFI 32 are provided below with respect to FIG. 3. Moreover, additional details regarding the operation and architecture of EFI can be found in the EFI specification which is available from INTEL CORPORATION and is expressly incorporated herein by reference.

Figure 3:
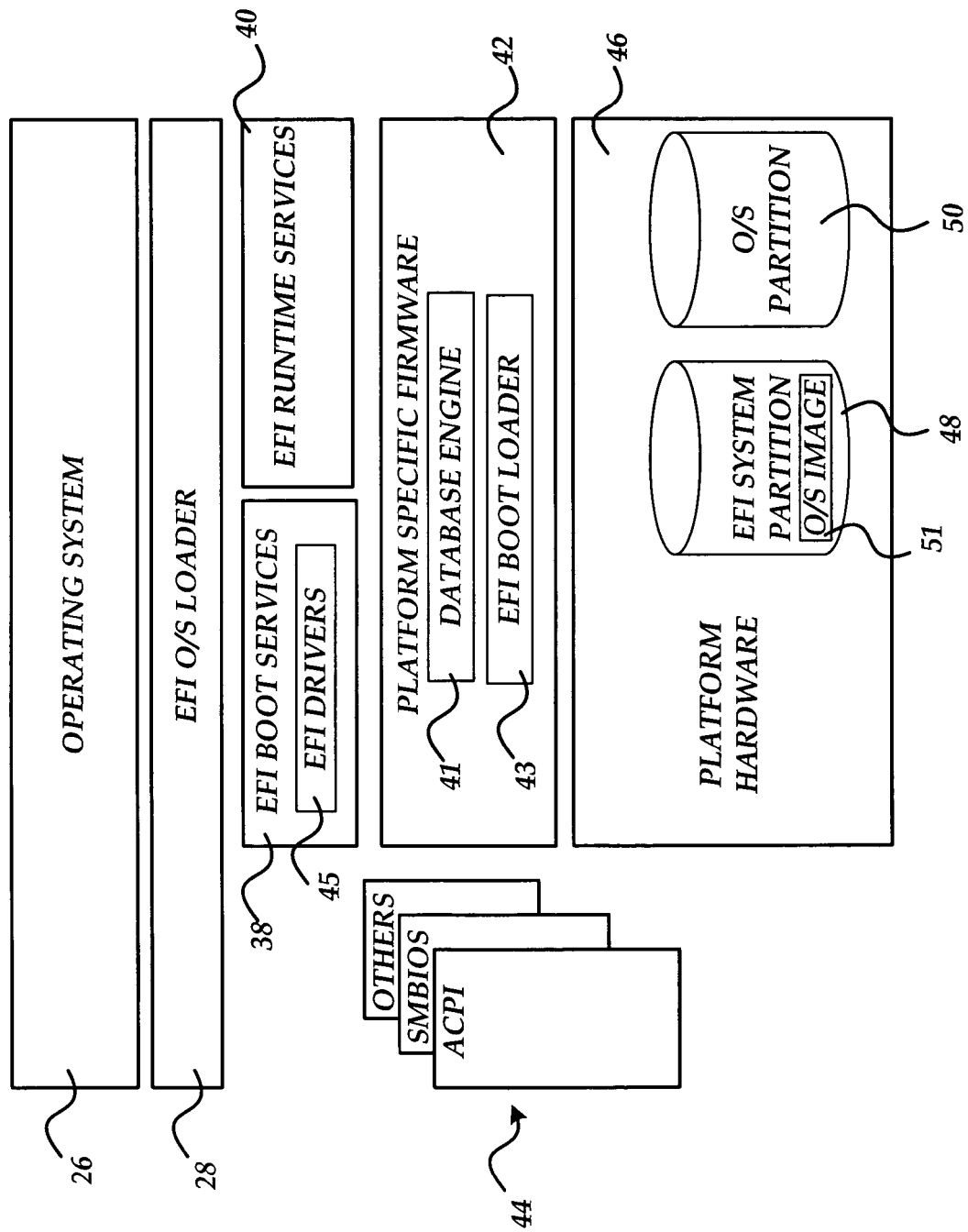

Turning now to FIG. 3, additional details regarding an EFI specification-compliant system utilized to provide an operating environment for the various embodiments of the invention will be described. As shown in FIG. 3, the system includes platform hardware 46 and an operating system 26. The platform firmware 42 may retrieve an OS image 51 from the EFI system partition 48 using an EFI O/S loader 28. The EFI system partition 48 may be an architecturally shareable system partition. As such, the EFI system partition 48 defines a partition and file system that are designed to allow safe sharing of mass storage between multiple vendors. An O/S partition 50 may also be utilized.

Once started, the EFI O/S loader 28 continues to boot the complete operating system 26. In doing so, the EFI O/S loader 28 may use EFI boot services 38 and interface to other supported specifications to survey, comprehend, and initialize the various platform components and the operating system software that manages them. Thus, interfaces 44 from other specifications may also be present on the system. For example, the Advanced Configuration and Power Management Interface ("ACPI") and the System Management BIOS ("SMBIOS") specifications may be supported.

EFI boot services 38 provides interfaces for devices and system functionality that can be used during boot time. EFI runtime services 40 may also be available to the O/S loader 28 during the boot phase. For example, a minimal set of runtime services may be presented to ensure appropriate abstraction of base platform hardware resources that may be needed by the operating system 26 during its normal operation. EFI allows extension of platform firmware by loading EFI driver and EFI application images which, when loaded, have access to all EFI-defined runtime and boot services.

Various program modules provide the boot and runtime services. These program modules may be loaded by the EFI boot loader 43 at system boot time. The EFI boot loader 43 is a component in the EFI firmware that determines which program modules should be explicitly loaded and when. Once the EFI firmware is initialized, it passes control to the boot loader 43. The boot loader 43 is then responsible for determining which of the program modules to load and in what order.

The various program modules executing within the EFI may have a need to store data in an easy to access and manage manner. Because the various program modules may utilize data of virtually any data type, there is also a need to store data of any arbitrary data type. The database engine 41 executes within the EFI and provides these services to other program modules executing within the EFI. The database engine 41 may be provided as a part of the EFI core or as a separate EFI driver. In particular, program modules executing within the EFI can utilize the database engine 41 to index stored data in a database. Records can be added to the database, removed from the database, and the database may be searched. Other types of database functions may also be performed on the records stored by the database engine 41.

A major feature of the EFI environment is modularity. Thus, every piece of hardware, such as a keyboard and a mouse, may be represented by a driver. EFI drivers 45 are a set of independent drivers that are capable of communicating with each other. The EFI drivers 45 are designed to access boot devices in a pre-boot environment. These drivers may manage or control hardware buses or devices on a platform or they may provide some software derived platform specific service. An EFI driver installs itself as a protocol handler for a particular device. Additional details regarding some of the EFI drivers 45 will be described below with respect to FIGS. 4 and 5.

Figure 4:
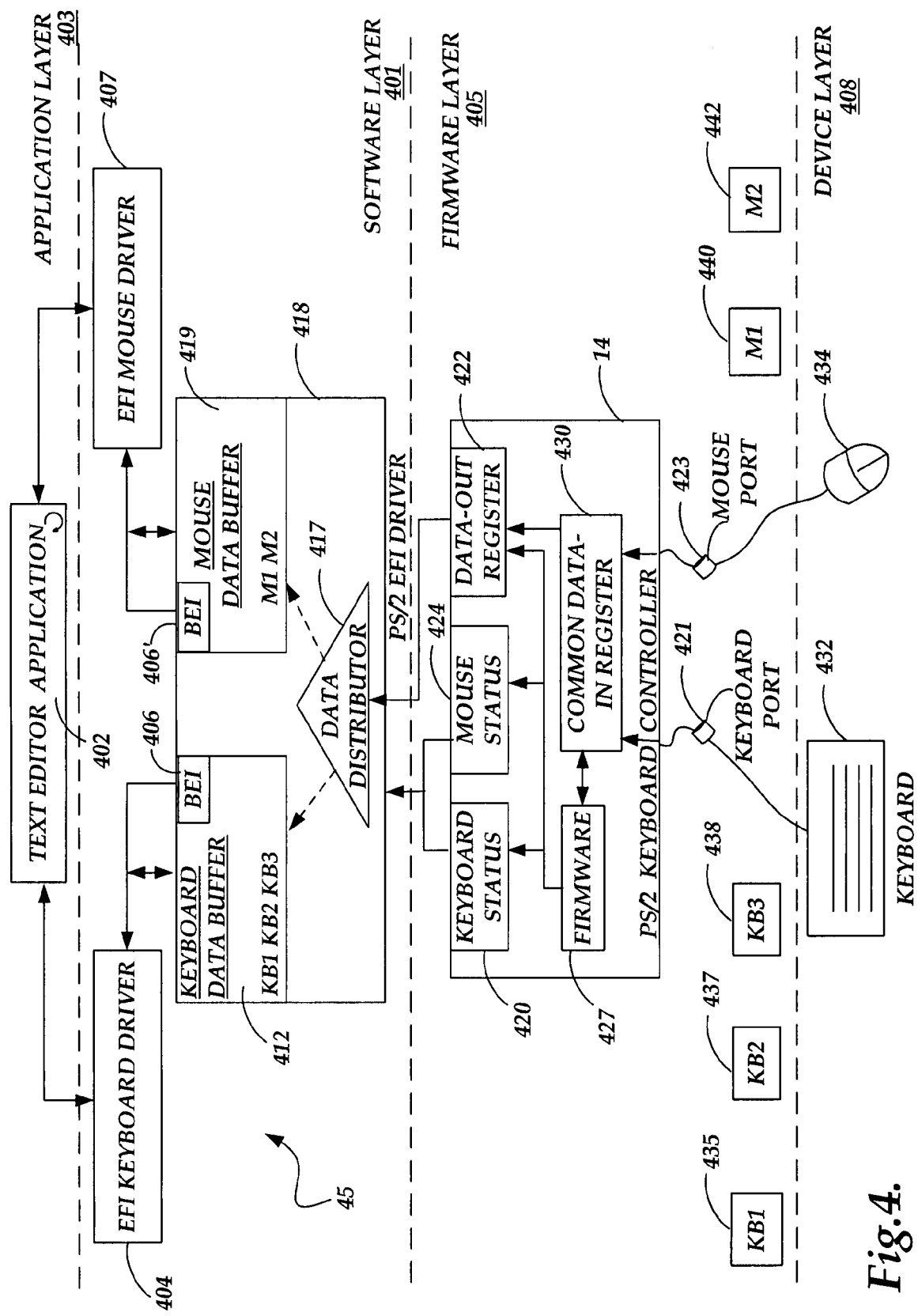
FIG. 4 is a block diagram that illustrates various components of a layered operating environment utilized in servicing PS/2 devices according to an embodiment of the invention.

FIG. 4 is a block diagram that illustrates various components of a layered operating environment utilized in servicing PS/2 devices, such as a PS/2 keyboard 432 and a PS/2 mouse 434, according to an embodiment of the invention. As illustrated, the EFI drivers 45 within a software layer 401 include an EFI keyboard driver 404, an EFI mouse driver 407, and a PS/2 EFI driver 418. The EFI keyboard driver 404 and the EFI mouse driver 407 are in communication with an application layer 403 including applications, such as a text editor application 402. The PS/2 EFI driver 418 is in communication with the PS/2 keyboard controller 14 on a firmware layer 405 and the EFI keyboard driver 404 and the EFI mouse driver 407 on the software layer 401. The PS/2 keyboard controller 14 receives data from the keyboard 432 and the mouse 434 on a device layer 408. Moreover, additional details regarding the operation and architecture of PS/2 keyboard controllers and other PS/2 devices can be found in the IBM Personal System/2 and Personal Computer BIOS Interface Technical Reference. Second edition. IBM Corporation, IBM No. S68X-2341-00, 1988.

The EFI specification specifies SimpleInput and SimplePointer protocols that are implemented by the EFI keyboard driver 404 and the EFI mouse driver 407 respectfully. Applications, such as the text editor application 402, use these protocols to observe input data from hardware, such as the keyboard 432 and the mouse 434, as the EFI drivers 45 service the hardware. The PS/2 EFI driver 418 communicates directly with firmware, the keyboard controller 14, of the hardware. The keyboard controller 14 services at least two different devices, the keyboard 432 and the mouse 434. It should be appreciated that the mouse 434 may also be a touchpad or other pointer device.

The keyboard controller 14 includes two independent ports 421 and 423 that allow the keyboard and the mouse to connect to the same controller. The keyboard controller 14 includes a common data-in register 430 in communication with the keyboard port 421 and the mouse port 423. Firmware 427 is also within the keyboard controller 14. The firmware 427 allows the keyboard controller 14 to differentiate between data coming from the mouse 434 and data coming from the keyboard 432. The firmware 427 communicates with the data-in register 430 and analyzes the data coming from the two ports 421 and 423 to determine an origin of the data.

The keyboard controller 14 also includes a common output or data-out register 422, which is also the only output register for both devices. The data-out register 422 is accessible by the EFI drivers 45. The PS/2 EFI driver 418 is able to distinguish whether the data has come from the mouse 434 or from the keyboard 432 by checking a keyboard status register 420 and/or a mouse status register 424 within the keyboard controller 14. The PS2 EFI driver 418, which includes the same required polling mechanism as the other drivers, serves as a single point for accessing the data-out register 422 of the keyboard controller 14. A data distributor mechanism 417 is included in the PS/2 EFI driver 418 to dispatch the data from the keyboard 432 to a memory destination, such as a keyboard data buffer 412, within the PS/2 EFI driver 418 for keyboard data. Similarly, when data is coming from the mouse 434, this data will be dispatched or sorted to a memory destination, such as mouse data buffer 419 for the mouse data. Thus, there are at least two internal destinations for data prepared by the PS/2 EFI driver 418 from which the EFI keyboard driver 404 and the EFI mouse driver 407 receive data.

It should be appreciated that although polling of the keyboard controller 14 still occurs within the PS/2 EFI driver 418, the status concerning data availability is not directly provided to the keyboard driver and mouse driver by the keyboard controller 14. The status concerning data availability is provided to these drivers by the PS/2 EFI driver 418. Because the PS/2 EFI driver 418 dispatches data from both devices, data is instantly available to the EFI mouse and keyboard drivers 407 and 404 whenever the data arrives at the keyboard controller 14 from the mouse 434 or the keyboard 432.

For instance, a multi-byte sequence of data produced by someone pressing a keyboard key, for example a functional key such as F1, and clicking a mouse button is instantly made available to the EFI keyboard driver 404 and the EFI mouse driver 407 by the PS/2 EFI driver 418 when the data is forwarded to the keyboard controller 14. Pressing a functional key can produce three scan codes KB1 435, KB2 437, and KB3 438. Similarly, clicking a mouse button produces two scan codes M1 440 and M2 442. In previous systems, scan codes M1 and/or M2 could possibly block scan codes KB1, KB2, and/or KB3 from being available to a driver due to the common data-out port 422 and polling methodologies. In the present invention, the data will come to the data-in register 430 and will automatically be stored in a queue for the data that is recognized inside the firmware. Only KB1 435 will appear in the output register 422 at first. KB1 435 will remain in the output register waiting for a read command.

As briefly described above, when the mouse 434 is clicked or moved at the same time, the sequence of scan codes in the data-out register can stagger between keyboard data and mouse data. The PS/2 EFI driver 418 sorts the data to avoid irretrievability, because the F1 key will only be retrievable if all three bytes of data KB1+KB2+KB3 are read and the mouse-click on the mouse 434 can be retrieved only when both bytes M1+M2 of data from the mouse are read. The PS/2 EFI driver 418 treats all the data from the output register 422 one-by-one. When the PS/2 EFI driver 418 recognizes keyboard data, it will distribute the keyboard data to the keyboard data buffer 412. Similarly, when the PS/2 EFI driver 418 recognizes mouse data, it distributes the mouse data to the mouse data buffer 419.

As illustrated, the data arrives at the data buffers 412 and 419 in the order it was sent, KB1, KB2, KB3 at the keyboard data buffer 412 and M1 and M2 at the mouse data buffer 419. Thus, the data becomes available in the data buffers 412 and 419 for consumption. In this illustrative embodiment, the consumer of the data is the EFI keyboard driver 404 and the EFI mouse driver 407. These drivers will know about the availability of the data just by reading a corresponding keyboard or mouse data buffer empty indicator (BEI) 406 or 406' at a memory destination. Thus, when data has been dispatched from the keyboard controller 14, the keyboard controller 14 is available for other keystrokes or the mouse movements while the PS/2 EFI driver 418 processes the data in the order it was sent.

Use of the PS/2 EFI driver 418 may begin when the text editor application 402 starts requesting the keys or requesting the mouse coordinates for display. The text editor application 402 produces a screen display and it needs user input. The text editor application 402 sends a loop asking the EFI keyboard driver 404 and/or the EFI mouse driver 407 for input and pointer data respectfully. Next, in response to the request from the text editor application 402, the EFI keyboard driver 404 and/or the EFI mouse driver 407 requests data from the PS/2 EFI driver 418. For instance, the EFI drivers 404 and 407 can verify whether data is present in the keyboard data buffer 412 or the mouse data buffer 407 by respectively checking the BEI 406 or 406'. When the BEI 406 or 406' indicates that the buffer is not empty, the EFI drivers 404 and/or 407 read the memory destination that contains an indication of the presence of keyboard and/or mouse data.

The PS/2 EFI driver 418 then determines whether any data is available in the keyboard controller 14 by detecting a status of the keyboard status register 420 and the mouse status register 424. If either status register indicates a presence of data, the PS/2 EFI driver 418 dispatches the data from the data-out register to the data distributor 417 and then distributes the data between the mouse and keyboard data destinations for delivery to the EFI keyboard and/or mouse drivers. When the data is dispatched the corresponding status register is cleared until more data arrives in the keyboard controller 14. If no data is available the PS/2 EFI driver returns no data. Thus, the PS/2 EFI driver 418 may be initiated in response to a request from the mouse and/or keyboard driver for data. When the text editor application 402 request data a second time from the keyboard driver, the data will be waiting in the queue of the keyboard driver 404 ready to be passed to the text editor application 402 thereby improving efficiency. Additional details regarding servicing PS/2 devices will be described below with respect to FIG. 5.

Figure 5:
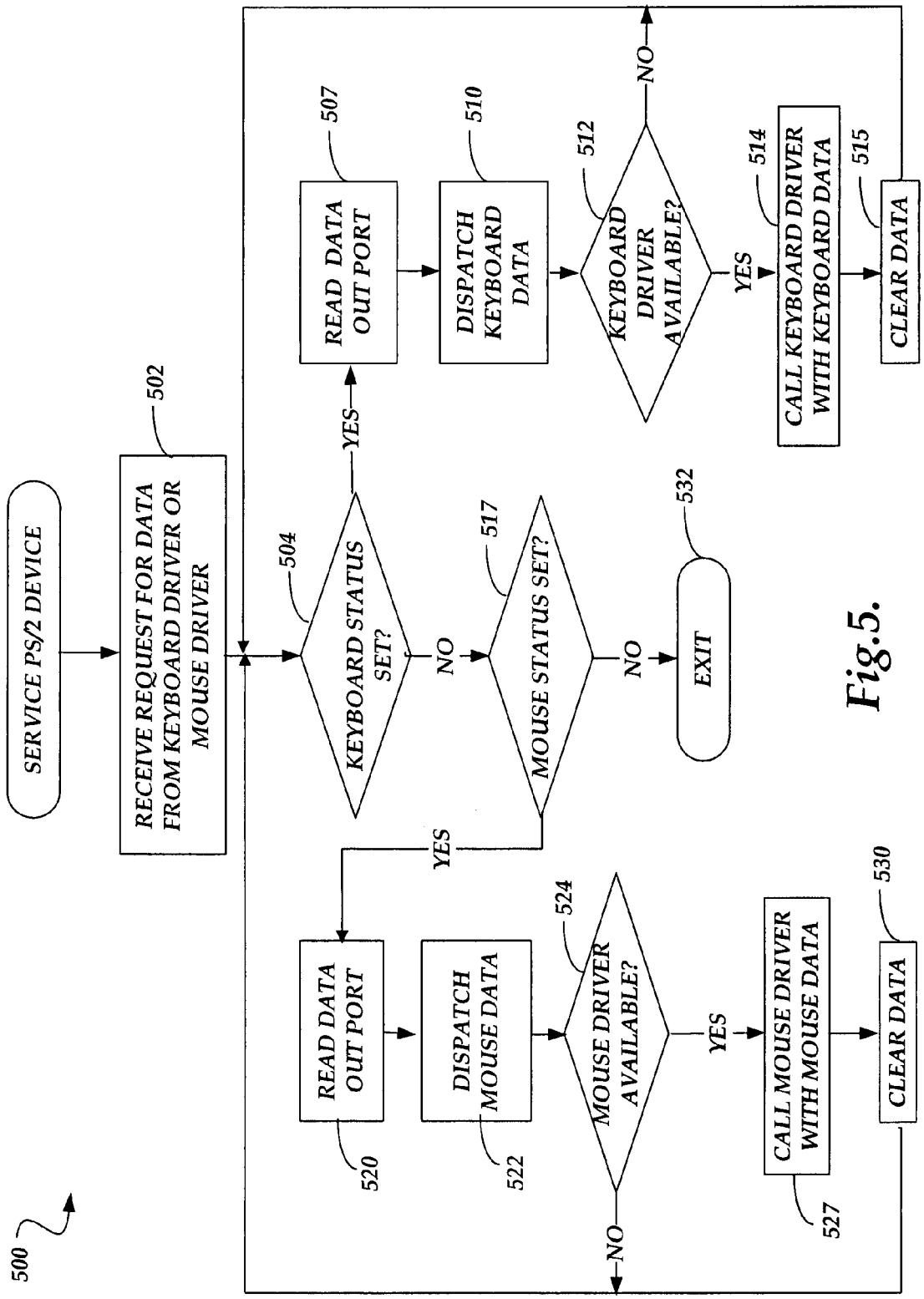
FIG. 5 is a flow diagram illustrating operations performed in servicing PS/2 devices within an EFI environment according to an embodiment of the invention.

Referring now to FIGS. 4 and 5, an illustrative routine 500 will be described in detail for servicing PS/2 devices within an EFI environment according to an embodiment of the invention. The logical operations of the various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

The routine 500 begins at operation 502, where the PS/2 EFI driver 418 receives a request for data from the EFI keyboard driver 404 and/or the EFI mouse driver 407. For instance, the request for data may be in response to the text editor application 402 requesting data from the EFI keyboard driver 404 and/or the EFI mouse driver 407 for a screen display. From operation 502, the routine 500 continues to operation 504.

At operation 504, in response to receiving the request for data, the PS/2 EFI driver 418 determines whether a keyboard status is set in the PS/2 keyboard controller 14. The PS/2 EFI driver 418 determines the keyboard status by detecting whether the keyboard status register 420 indicates that keyboard data is available for dispatch in the keyboard controller 14. When keys are pressed at the keyboard 432, data, such as the scan codes 435, 437 and 438, is forwarded to the data-in register 430. The firmware 427 examines the data and determines the origin of the data. When the data is from the keyboard 432, the firmware 427 updates the keyboard status register 420 to indicate that keyboard data is present in the keyboard controller 14. Similarly, when data is sent from the mouse 434, the firmware 427 updates the mouse status register 424 to indicate mouse data, such as the scan codes 440 and 442, is present in the keyboard controller 14. From operation 504, the routine 500 continues to operation 507.

At operation 507, in response to determining that the keyboard status is set, the PS/2 EFI driver reads the data-out register 422 for keyboard data. Next, from operation 507, the routine 500 continues to operation 510, where the PS/2 EFI driver 418 dispatches the data read from the data-out register 422 to the keyboard data buffer 412 via the data distributor 417. From operation 510, the routine 500 continues to operation 512.

At operation 512, the PS/2 EFI driver 418 determines whether the EFI keyboard driver 404 is available to receive data. If the EFI keyboard driver 404 is not available, the routine 500 returns to operation 504 described above. When the EFI keyboard driver 404 is available, the routine 500 continues from operation 512 to operation 514.

At operation 514 the PS/2 EFI driver 418 calls the EFI keyboard driver 404 to deliver the data to the EFI keyboard driver 404. Next, at operation 515, the PS/2 EFI driver 418 clears the keyboard data buffer 412. The routine 500 then returns to operation 504 described above. It should be appreciated that the PS/2 EFI driver 418 will still poll the keyboard controller 14 as required by the EFI specification. This polling also enables the PS/2 EFI driver to detect data entry without being prompted by a request for data, such as in the case of receiving a CTRL-ALT-DEL command or other registered hot-key.

If at operation 504, the PS/2 EFI driver 418 determines that the keyboard status is not set, the routine 500 continues from operation 504 to operation 517. At operation 517, the PS/2 EFI driver 418 determines whether the mouse status is set. If the mouse status register 424 does not indicate that mouse data is present, the routine 500 continues to exit operation 532 where it ends. When at operation 517, the mouse status register 424 indicates that mouse data is present in the keyboard controller 14, the routine 500 continues from operation 517 to operation 520. It should be appreciated that the PS/2 EFI driver 418 processes mouse data in response to an EFI keyboard driver request, if mouse data is available at this time. Similarly, keyboard data is processed by the PS/2 EFI driver 418 in response to an EFI mouse driver request, if keyboard data is available during such request. This doubles the responsiveness of the PS/2 EFI driver 418.

At operation 520, in response to determining that the mouse status is set, the PS/2 EFI driver 418 reads the data-out register 422 for mouse data. Next, from operation 520, the routine 500 continues to operation 522, where the PS/2 EFI driver 418 dispatches the data read from the data-out-register 422 to the mouse data buffer 419 via the data distributor 417. From operation 522, the routine 500 continues to operation 524.

At operation 524, the PS/2 EFI driver 418 determines whether the EFI mouse driver 407 is available to receive data. If the EFI mouse driver 407 is not available, the routine 500 returns to operation 504 described above. When the EFI mouse driver 407 is available, the routine 500 continues from operation 524 to operation 527.

At operation 527 the PS/2 EFI driver 418 calls the EFI mouse driver 407 to deliver the data to the EFI mouse driver 407. Next, at operation 530, the PS/2 EFI driver 418 clears the mouse data buffer 419. The routine 500 then returns to operation 504 described above.

It should be appreciated that embodiments of the present invention provide methods, systems, apparatuses, and computer-readable media for servicing PS/2 devices within an EFI environment. Although the invention has been described in language specific to computer structural features, methodological acts and by computer readable media, it is to be understood that the invention defined in the appended claims is not necessarily limited to the specific structures, acts or media described. Therefore, the specific structural features, acts and mediums are disclosed as exemplary embodiments implementing the claimed invention.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

We claim:

1. A method for accessing PS/2 (Personal System/2) devices in a pre-boot environment utilizing drivers loaded by a firmware compatible with an Extensible Firmware Interface (EFI) specification wherein the PS/2 devices provide data via a common input device controller, the method comprising:

receiving from an EFI driver compatible with the EFI specification a request for data, wherein the request is received at an intermediary driver in communication with the EFI driver and the common input device controller;

in response to receiving the request, determining whether data from any of the PS/2 devices is available for delivery to one or more EFI drivers via the common input device controller; and in response to determining that the data is available for delivery, dispatching the data from the common input device controller based on which PS/2 devices provided the data.

2. The method of claim 1, wherein receiving the request for data comprises receiving a request for data from at least one of the following:
   an EFI input device driver; and
   an EFI pointer device driver.

3. The method of claim 2, wherein determining whether the data from any PS/2 device is available for delivery comprises at least one of the following:
   detecting whether input device data is currently stored within the common input device controller; and
   detecting whether pointer device data is currently stored within the common input device controller.

4. The method of claim 2, wherein dispatching the data from the common input device controller comprises:
   reading the data from a data out port of the common input device controller; and
   distributing the input device data to an input data memory destination and the pointer device data to a pointer data memory destination.

5. The method of claim 4, further comprising forwarding the data to the EFI drivers associated with a PS/2 device providing at least some of the data.

6. The method of claim 5, wherein forwarding the data comprises:
   determining whether an EFI driver associated with a PS/2 device providing at least some of the data is available to receive data; and
   in response to determining that the EFI driver is available to receive data, calling the EFI driver and delivering at least some of the data to the EFI driver.

7. The method of claim 5, wherein forwarding the data comprises forwarding data to at least one of the following:
   the EFI input device driver; and
   the EFI pointer device driver.

8. The method of claim 7, further comprising in response to forwarding the data, clearing the data from at least one of the following:
   the input data memory destination; and
   the pointer data memory destination.

9. The method of claim 1, wherein the PS/2 devices comprise a keyboard and a mouse and wherein the common input device controller comprises a keyboard controller.

10. The method of claim 9, wherein dispatching the data from the common input device controller comprises:
    reading from a data out port of the keyboard controller multiple scan codes representing a function key input from the keyboard and multiple scan codes representing a click of a mouse button from the mouse; and
    distributing the multiple scan codes representing the function key input to an input data memory destination and the multiple scan codes representing the click of a mouse button to a pointer data memory destination.

11. A computer storage medium having computer-executable instructions stored thereon which, when executed by a computer, cause the computer to perform the method of claim 1.

12. A computer storage medium having control logic stored therein for causing a computer to access PS/2 (Personal System/2) devices in a pre-boot environment wherein the PS/2 devices provide data via a keyboard controller, the control logic comprising computer-readable program code for causing the computer to:
   receive from an EFI driver loaded by a firmware compatible with an EFI specification a request for data, wherein the request is received at an intermediary driver in communication with the EFI driver and the common input device controller;
   determine whether data from any of the PS/2 devices is available for delivery to one or more EFI drivers via the keyboard controller in response to receiving the request;
   in response to determining that the data is available for delivery, dispatch the data from the keyboard controller based on which PS/2 devices provided the data; and
   forward the data to the EFI drivers associated with a PS/2 device providing at least some of the data.

13. The computer storage medium of claim 12, wherein the computer-readable program code for causing the computer to receive the request for data is operative to cause the computer to receive a request for data from at least one of the following:
    an EFI keyboard driver; and
    an EFI mouse driver.

14. The computer storage medium of claim 12, wherein the computer-readable program code for causing the computer to determine whether the data from any PS/2 device is available for delivery is operative to cause the computer to detect at least one of the following:
    whether keyboard data is currently stored within the keyboard controller; and
    whether mouse data is currently stored within the keyboard controller.

15. The computer storage medium of claim 12, wherein the computer-readable program code for causing the computer to dispatch the data from the keyboard controller is operative to cause the computer to:
    read multiple keyboard scan codes and multiple mouse scan codes from a data out port of the keyboard controller; and
    distribute the multiple keyboard scan codes to an input data memory destination and the multiple mouse scan codes to a pointer data memory destination.

16. The computer storage medium of claim 12, wherein the computer-readable program code for causing the computer to forward the data is operative to cause the computer to:
    determine whether an EFI driver associated with a PS/2 device providing at least some of the data is available to receive data; and
    in response to determining that the EFI driver is available to receive data, call the EFI driver and deliver at least some of the data to the EFI driver.

17. A computing system for accessing PS/2 (Personal System/2) devices in a pre-boot environment, the computing system comprising:
    a plurality of EFI device drivers compatible with an EFI specification and operative to execute in the pre-boot environment;
    a PS/2 keyboard controller operably connected to a plurality of PS/2 devices; and
    a PS/2 EFI driver compatible with the EFI specification and operative to execute in the pre-boot environment the PS/2 EFI driver in communication with the plurality of EFI device drivers and the PS/2 keyboard controller, and operative to:
        determine whether data from any one of the plurality of PS/2 devices is available at the PS/2 keyboard controller for delivery to at least one of the plurality of EFI device drivers, retrieve available data from the PS/2 keyboard controller and distribute the data to a data memory destination within the PS/2 EFI driver corresponding to a PS/2 device that provided the data, and forward the data to the EFI device driver associated with the PS/2 device that provided the data.

18. The system of claim 17, wherein the plurality of PS/2 devices comprises a PS/2 keyboard device and a PS/2 mouse device; and wherein the plurality of EFI device drivers comprises an EFI keyboard driver and an EFI mouse driver.

19. The system of claim 18, wherein determining whether data from any one of the plurality of PS/2 devices is available at the PS/2 keyboard controller comprises detecting whether keyboard data or mouse data is currently available at a data out port of the PS/2 keyboard controller, and wherein forwarding the data to the EFI device driver comprises forwarding the keyboard data to the EFI keyboard driver and forwarding the mouse data to the EFI mouse driver.

* * * * *

UNITED STATES PATENT AND TRADEMARK OFFICE
CERTIFICATE OF CORRECTION

PATENT NO. : 7,426,582 B1  Page 1 of 1
APPLICATION NO. : 11/119318
DATED : September 16, 2008
INVENTOR(S) : Oleg Ilyasov and Andriy Naborskyy It is certified that error appears in the above-identified patent and that said Letters Patent is hereby corrected as shown below:

Beginning in Column 7, line 25, the first sentence should read:

The [[PS2]] PS/2 EFI driver...

Beginning in Column 8, line 58, the sentence should read:

When the text editor application 402 ~~request~~ requests data a second...

Beginning Claim 17 in Column 12, line 60, it should read as follows:

..operative to execute in the pre-boot environment, the...

Signed and Sealed this

Tenth Day of August, 2010

David J. Kappos
*Director of the United States Patent and Trademark Office*